United States Patent [19]
Manuel

[11] Patent Number: 5,894,817
[45] Date of Patent: Apr. 20, 1999

[54] MULTI-FUNCTION PET CARRIER

[76] Inventor: Kathy Manuel, 1349 Emerald Dr., Crystal Beach, Tex. 77650

[ * ] Notice: This patent is subject to a terminal disclaimer.

[21] Appl. No.: 08/919,697

[22] Filed: Aug. 28, 1997

Related U.S. Application Data

[63] Continuation-in-part of application No. 08/572,735, Dec. 14, 1995, Pat. No. 5,738,043.

[51] Int. Cl.[6] .................................................. A01K 29/00
[52] U.S. Cl. ............................ 119/497; 119/497; 119/907
[58] Field of Search ................................. 119/496, 497, 119/607, 907, 792, 793, 850, 856; 54/79.1

[56] References Cited

U.S. PATENT DOCUMENTS

| | | | |
|---|---|---|---|
| 3,742,679 | 7/1973 | Jordan | 54/79 |
| 3,895,628 | 7/1975 | Adair | 54/23 |
| 3,918,238 | 11/1975 | Iozzio | 54/79 |
| 4,137,870 | 2/1979 | Cano | 119/96 |
| 5,738,043 | 4/1998 | Manual | 119/497 |

*Primary Examiner*—Thomas Price
*Attorney, Agent, or Firm*—Michael P. Breston

[57] ABSTRACT

The pet carrier includes a garment having a pair of left and right side panels extending from a center bottom panel. Each panel has forward and rear leg openings. The opposite ends of a shoulder strap are releasably attached to linking device on the panels' edges. By unhooking the shoulder strap only from the tail side linking device, the carrier is turned into a collarless leash for the pet.

20 Claims, 3 Drawing Sheets

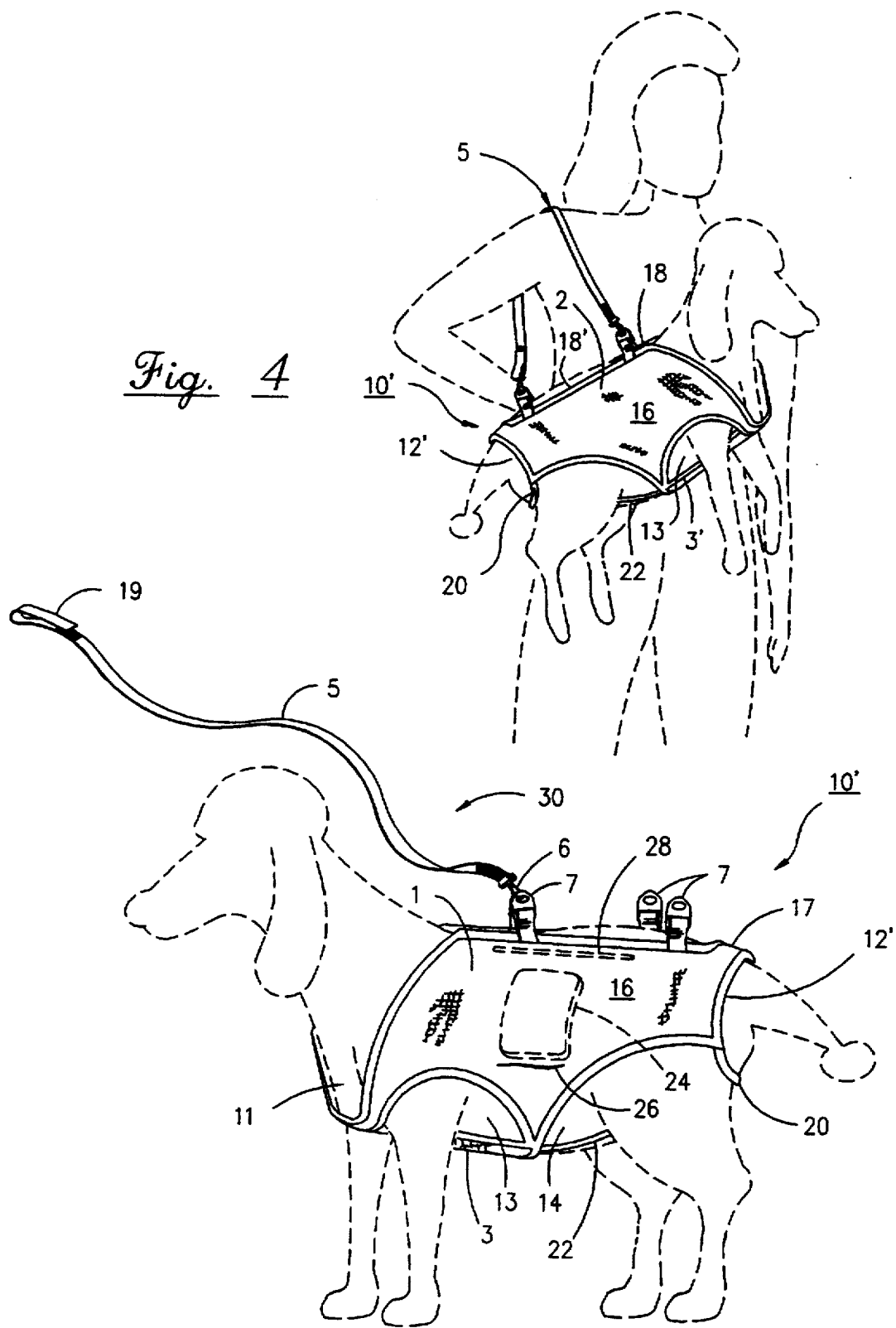

5,894,817

1

MULTI-FUNCTION PET CARRIER

REFERENCE TO RELATED APPLICATION

This is a continuation-in part of my application, Ser. No. 08/572,735, filed on Dec. 14, 1995, and entitled SMALL ANIMAL CARRIER, and now U.S. Pat. No. 5,738,043.

BACKGROUND OF THE INVENTION

1. Field of the Invention

This invention relates generally to pet carriers and more particularly to such pet carriers that are multi-functional.

2. Description of the Prior Art

Doyle (U.S. Pat. No. 4,644,902) shows a pet carrier comprising a body portion, having four leg openings for the occupant's legs to extend through, and integral straps extending from opposing sides of the body portion. A pair of flexible restraining panels are attached to the body portion outwardly of the openings. A connector at the free edges of the panels detachably links them together in overlying engagement with the pet. The straps are brought together above and in spaced relation to the connector whereby the carrier is formed into a sling for the occupant with its legs protruding through the leg openings.

Nissen (U.S. Pat. No. Des. 290,178) shows a pet carrier having a body portion providing an opening for the pet's neck as well as two close-ended leg pockets and a shoulder strap: the two forward legs go into one pocket and the hind legs go into the other pocket. The forward and hind legs are obviously restrained within these pockets. The shoulder strap is permanently attached to and forms part of the carrier.

Kitchens (U.S. Pat. No. 5,193,486) shows a pet jacket-carrier having a flexible bag-like body member which includes a torso support portion, a neck loop 20, carrying handles 30, a rear leg support pocket 12, and a hind legs support portion. A neck brace is attached to the open forward end, and a pair of strap handles are attached to respective sides of the body member. A slit extends along the top of the body member which can be opened and closed by a zipper.

The known art carriers have many well-known deficiencies. For example, when used in a shoulder holder mode, the prior art pet devices have difficulty in maintaining above ground the animal's body in a natural, upright or standing position. This handicap is especially troublesome to the pet's handler while running or bending.

It is a general object of this invention to provide an effective, efficient, compact and multi-function pet carrier, which can be useful for a wide range of small pets, and which substantially enhances the comfort experienced by the pet and its handler during the pet carrying process, while at the same time making it relatively inexpensive to fabricate.

SUMMARY OF THE INVENTION

The multi-function pet carrier is designed to serve as a wearable garment for a small pet, as a carrier for carrying it around, as a collarless pet leash, and as a life jacket. The garment includes right and left side panels and a bottom panel. The side panels have two pairs of cutouts for accepting the pet's front and hind legs. The front end of the bottom panel and the front ends of the side panels form therebetween a neck opening for the pet's neck to freely extend therethrough.

In one embodiment, the rear end of the bottom panel and the rear ends of the side panels form therebetween a tail opening for the pet's tail to freely extend therethrough.

In the preferred embodiment, the rear end of the bottom panel extends from its front end rearwardly only up to about the rear leg cutouts. A linking member, preferably an elastic band, is attached to the rear ends of the side panels to form therewith a tail hole for the pet's tail to freely extend therethrough. Bottom support means, preferably made of an elastic material, link the bottom panel's rear end with the linking member. The preferred bottom support means include a pair of longitudinally-spaced elastic ribbons.

A pair of handles are attached to the mid-sections of the side panels. Releasable, longitudinally-spaced, connecting means have front and rear portions thereof attached to the side panels on the opposite sides of the handles. The opposite ends of a shoulder strap have means for releasably engaging the front and rear portions of the connecting means. The connecting means preferably include two pairs of rings. The shoulder strap's engaging means include preferably snap hooks for hooking the rings. The garment can be desirably provided with pockets for removably accepting flotation members therein.

DESCRIPTION OF THE DRAWINGS

FIG. 4 is a perspective view of the pet wearing the carrier shown in FIG. 2 and hanging from its handler's shoulder, taken from a position facing the garment's left side panel; and FIG. 5 is a perspective view of the carrier shown in FIG. 2, on the pet, in its leash-holder mode, taken from a position facing the garment's right side panel.

DETAILED DESCRIPTION OF PREFERRED EMBODIMENTS

Figure 1:
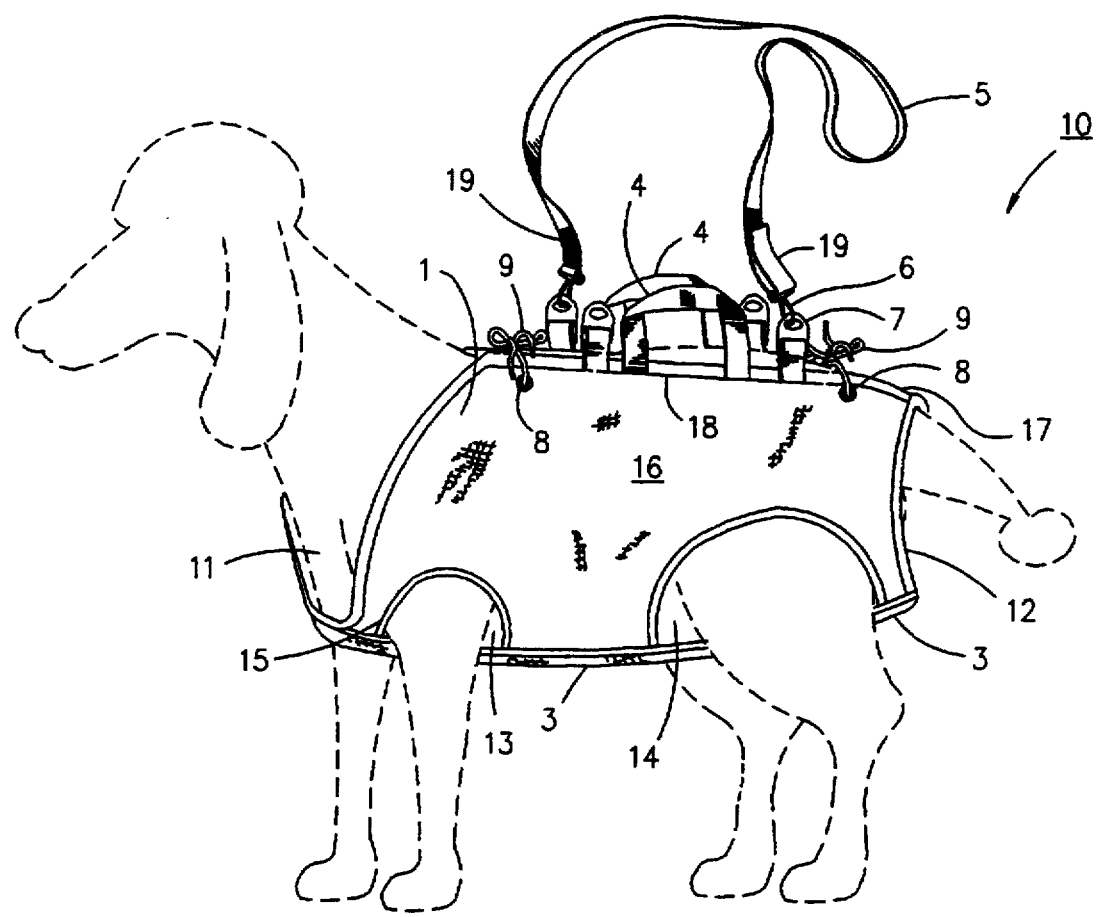
FIG. 1 is a perspective view of one embodiment of the multi-function carrier in its shoulder-holder mode, taken from a position facing the garment's right side panel.

In the drawings the same reference characters are used as in said copending patent application, sometimes followed by a prime (') to indicate similarity and to avoid repetition of the same or similar physical and functional properties of the parts involved.

The multi-function pet carrier 10, shown in FIG. 1, is designed to serve as a wearable garment 16 for a small pet, as a carrier for carrying it around, as a collarless pet leash 30 (FIG. 5), and as a life jacket.

Garment 16 (FIG. 1) has a body portion including a right side panel 1, a left side panel 2, and a bottom support panel 3. Right and left side panels 1 and 2 symmetrically extend from and are unitary with bottom panel 3. Panels 1 and 2 have free top longitudinal edges 18,18', a pair of front leg openings 13, and a pair of hind leg openings 14, all symmetrically disposed relative to bottom panel 3.

The front end of bottom panel 3 and the front ends of side panels 1,2, in use, form therebetween a neck opening 11 for freely accepting the pet's neck.

The rear end of bottom panel 3 and the rear ends of side panels 1,2 form therebetween a tail opening 12 for the pet's tail to freely extend therethrough.

The rear ends of the longitudinal edges 18, 18' are preferably attached together as at 17 starting from tail hole 12 and extending forwardly and longitudinally up to nearly midway between tail hole 12 and the rear portion of the connecting means 7 on the longitudinal edges 18,18'. All outer and inner panel edges are preferably covered, as by stitching, with a ribbon 15 for added strength and greater appearance.

Two pairs of longitudinally-spaced forward and rear eyelets 8 are provided near to the opposite ends of top edges 18, 18' for accepting tie laces 9.

A pair of flexible handle straps 4 are fixedly attached to the mid-sections of top edges 18,18'.

Releasable, longitudinally-spaced, connecting means have front and rear portions thereof attached to side panels 1,2 on the opposite sides of handles 4. The connecting means can assume different shapes. They preferably include two pairs of longitudinally-spaced D-rings 7.

An elongated flexible shoulder strap 5 is provided with hooking means at each end thereof. Preferably, the hooking means is a snap D-hook 6 for releasably hooking a mating D-ring 7. Each end of strap 5 can loop back on itself around its D-hook 6, and is provided with a hook-and-loop fastener 19 of the Velcro type.

Garment 16 is made up of a suitable flexible, strong material, preferably a woven, washable, easily deformable cotton fabric which has sufficient strength to support the pet above ground in any selected carrier modality, and to readily conform to the shape of the pet's body in any position assumed by it.

The preferred embodiment of the carrier is generally designated as 10' (FIGS. 2–5). In it the rear edges of side panels 1 and 2 are shorter compared to the rear edges of side panels 1 and 2 in carrier 10 (FIG. 1). The bottom panel 3' is also shorter compared to bottom panel 3 in FIG. 1.

The rear ends of side panels 1,2 are attached to a linking member, preferably a flat elastic band 20, to form therewith an annular tail hole 12' for freely accepting the pet's tail. Elastic band 20 avoids irritating the pet's tail as it moves around.

Figure 2:
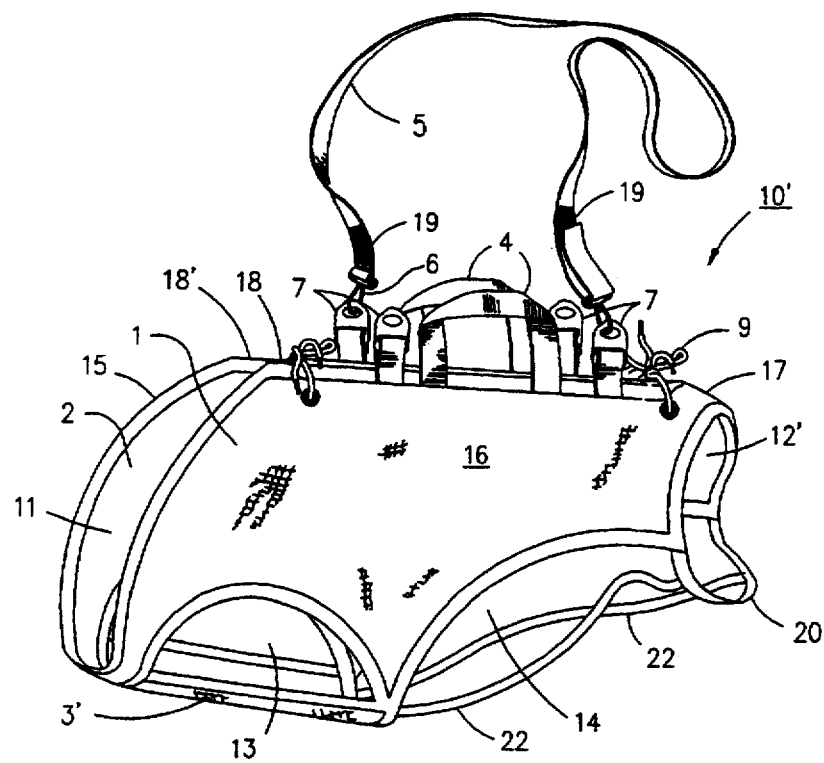
FIG. 2 is a perspective view of the preferred embodiment of the multi-function carrier also in its shoulder-holder mode.
Figure 3:
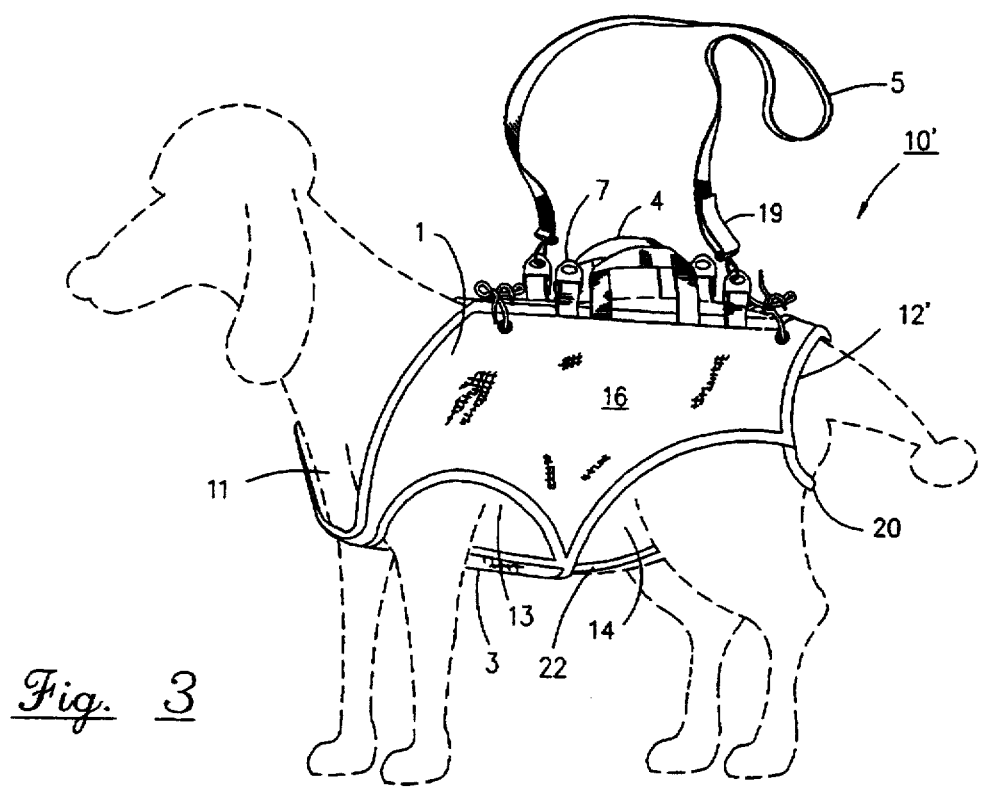
FIG. 3 is a perspective view of the pet wearing the carrier in its shoulder-holder mode shown in FIG. 2.

The rear end of bottom panel 3' extends from its front end rearwardly only up to about the start of the rear leg cutouts 14 (FIG. 2).

Bottom support means, preferably made of an elastic material, links the rear end of bottom panel 3' with linking member 20. The preferred bottom support means includes a pair of longitudinally-spaced elastic ribbons 22.

I have found that even though bottom panel 3' (FIG. 2) is about half the length of bottom panel 3 (FIG. 1), it is still sufficiently strong for carrying around the pet.

In fact, shorter bottom panel 3' gives the pet more freedom of movement, when it is shoulder supported, between a normal, upright, level position and a sitting position.

It is also easier for the handler to maintain the pet's body in a sitting or in an upright position which is appreciated when its handler is running or bending.

Desirably, panels 1 and 2 have double walls. Located within the interior space of one double wall is a longitudinal rigid rod 28 which facilitates placing garment 16 on the pets' torso.

Located on the exterior faces of side panels 1 and 2 are easily accessible pockets 26, only one is shown in FIG. 5, each removably accepting therein a floatation member 24.

The modes of using carriers 10,10' are the same and will now be described.

Garment Mode

When it is desired for the pet to wear garment 16, it will be drawn up to the pet from below, with its tail freely and loosely extending through tail hole 12 or 12', and with its legs protruding loosely through leg openings 13 and 14. Then the front corners of the top edges 18,18' are joined together by tie lace 9 over the pet's back to form neck opening 11. Thus, lace 9 prevents the pet from dropping garment 16 on the ground.

Between the tied lace 9 and stitched corners 17, the spaced-apart top edges 18, 18' define therebetween an elongated, open longitudinal slit. The pet when loosely covered with garment 16 is free to run around and is not restricted in the movements of any part of its body.

Handle Holder Mode

With handles 4, the pet's handler can support and carry around the garment wearing pet in a natural upright level position, while its forward and hind legs remain substantially equidistant from the ground and free to move externally of garment 16.

Shoulder Holder Mode

When it is desired to use shoulder strap 5, it suffices to hook up its front and rear D-hooks 6 to their mating D-rings 7 (FIG. 4). The length of shoulder strap 5 can be easily adjusted for any particular pet handler with the Velcro fasteners 19.

With shoulder strap 5, the pet's handler can lift, support and carry around the garment wearing pet from her shoulder in a natural upright position or in a sitting position. In the natural position, the pet's back remains substantially parallel to the ground and its front and hind legs are free to move externally of garment 16. The handler's hands remain free to attend to other tasks.

Leash Holder Mode

When it is desired to use the garment as a collarless leash, it suffices to unhook only the rear D-hook 6 from its D-ring 7 (FIG. 5). Garment 16 is thus turned into a leash 30 without requiring a collar. The pet can be walked around while being restrained by the combined actions of the released portion of shoulder strap 5 and of garment 16. Finally, by unhooking the forward end of shoulder strap 5 from its linking D-ring 7, the pet is returned back to its garment mode for running around at will without its handler.

Life Jacket Mode

By inserting the buoyancy members 24 into their respective pockets 26, garment 16 converts into a life jacket. This is especially beneficial for young pets.

In general, it will be noted that the different modalities selectively assumed by pet carrier 10 are achievable without having to remove garment 16 from the pet's back to change from one modality to an other, and without interfering with the movements of the pet's neck, legs, and tail. Additionally, these achievable modalities minimally interfere with the natural needs of the pet, especially when using a carrier 10' having spaced apart ribbons 22.

The pet carriers 10,10' are easy to use and comfortable both for the pet and for its handler. No excessive pressure points are generated that might tend to cause skin irritation for the pet wearing it. The garment when not in use folds into a substantially flat conformation for storage.

It will be appreciated that the desired objectives of this invention have been successfully accomplished by virtue of relative simplicity, flexibility, versatility, and ease and economy of fabrication.

What I claim is:

1. A multi-function pet carrier capable of serving (1) as a wearable garment for a very small four-legged pet, (2) as a carrier for carrying it around, and (3) as a collarless pet leash for walking and restraining the pet, said carrier comprising:

a body portion made of a flexible material defining a bottom panel and a pair of left and right side opposite panels extending from and being unitary with opposite longitudinal edges of said bottom panel, each side panel having a longitudinal top edge, front and rear side edges, and a pair of longitudinally spaced cutouts for accepting the pet's front and hind legs therethrough;

releasable, longitudinally-spaced, connecting means having front and rear portions thereof on said opposite longitudinal edges of said left and right side panels;

said garment, in use, being drawn up to said pet from below, with its legs protruding freely through said cutouts, and with said opposite longitudinal edges being releasably joined together in opposing relation near to said pet's back, so that its neck can freely extend through a front opening formed between said joined opposite front side edges of said panels, and its tail can freely extend through a rear opening between said rear side edges of said panels, thereby allowing said garment wearing pet to run around freely and unrestricted in the movements of its neck, legs and tail;

an elongated multi-function strap means having front and rear portions thereof releasably attached to said front and rear portions of said connecting means, respectively, thereby converting said garment into said carrier for supporting and carrying said pet around in a natural position on said strap means from the shoulder of its handler, while said pet's front and hind legs remain substantially equidistant from the ground free to move externally of said garment, and when said rear portion of said strap means is released from said rear portion of said connecting means, said carrier converts into said collarless pet leash for walking and restraining said pet with said released rear portion of said strap means.

2. The multi-function pet carrier according to claim 1, and a pair of handles attached to the mid-sections of said top edges for supporting and carrying said pet around with said handles in a natural position, while its front and hind legs remain substantially equidistant from the ground free to move externally of said garment.

3. The pet carrier according to claim 1, wherein the lower rear ends of said side panels are linked to the rear end of said bottom panel; and the lower front ends of said side panels are linked to the front end of said bottom panel.

4. The pet carrier according to claim 1, wherein the rear ends of said opposite longitudinal edges of said side panels are attached together starting from said rear opening and extending forwardly and longitudinally up to nearly midway between said rear opening and said rear portion of said connecting means.

5. The pet carrier according to claim 1, wherein said joined top edges of said side panels form a narrow slit therebetween starting from the attached rear ends of said top edges.

6. The pet carrier according to claim 1, wherein said front portion of said connecting means includes a pair of opposite complementary front rings;

said rear portion of said connecting means includes a pair of opposite complementary rear rings; and said front and rear portions of said strap means, each having fastener means for releasably and respectively attaching to said front and rear pairs of rings.

7. The pet carrier according to claim 1, wherein at least said front portion of said connecting means includes a pair of opposed eyelets; and a tie for joining said eyelets so as to, in use, maintain said garment on said pet's back.

8. The pet carrier according to claim 2, wherein said handles and said strap means are made of a flat, flexible woven ribbon;

said material of said body portion is a woven fabric; and said carrier, when not in use, folds into a substantially flat conformation for storage.

9. The pet carrier according to claim 1, wherein at least one of said side panels has a double wall; and a rigid longitudinal member is lodged within said double wall.

10. The pet carrier according to claim 1, and a flotation member; and said body portion includes a space for removably accepting said flotation member.

11. A wearable garment for a small four-legged pet, said garment including a body portion defining right and left side panels and a bottom panel therebetween, said side panels having longitudinal top edges and two pairs of cutouts for accepting the pet's front and hind legs, the front end of said bottom panel and the front ends of said side panels forming therebetween a neck opening for the pet's neck to freely extend therethrough, the improvement wherein the rear end of said bottom panel extends from its front end rearwardly to about the rear leg cutouts;

a linking member is attached to the rear ends of said side panels to form therewith an annular tail hole for the pet's tail to freely extend therethrough; and bottom support means for linking said bottom panel's rear end with said linking member.

12. The wearable garment according to claim 11, wherein said linking member is an elastic band; and said support means include a pair of longitudinally-spaced elastic ribbons connecting said bottom panel's rear end to said elastic band, whereby, in use, said pair of elastic ribbons flex and stretch with said pet's body movements.

13. The wearable garment according to claim 12, and releasable, longitudinally-spaced, connecting means having front and rear portions thereof attached to said top edges; and a strap having on its opposite ends attaching means for releasably attaching said strap to said front and rear portions of said connecting means.

14. The wearable garment according to claim 13, and said front portion of said connecting means includes a pair of opposite complementary front rings;

said rear portion of said connecting means includes a pair of opposite complementary rear rings; and said strap's front and rear attaching means, each having a fastener for releasably and respectively attaching to said front and rear rings.

15. The wearable garment according to claim 13, and a pair of handles attached to the mid-sections of said top edges for supporting and carrying said pet around with said handles.

16. The wearable garment according to claim 13, wherein
said handles and said strap means are made of a flat, flexible woven ribbon;
said material of said body portion is a woven fabric; and
said garment, when not in use, folds into a substantially flat conformation for storage.

17. The wearable garment according to claim 11, wherein
the rear ends of said top edges are attached together starting from said tail hole and extending forwardly and longitudinally up to nearly midway between said tail hole and said rear portion of said connecting means;
at least one of said side panels has a double wall; and
a rigid longitudinal member is lodged within said double wall.

18. The wearable garment according to claim 11, wherein
said body portion includes a space for removably accepting a flotation member therein.

19. The wearable garment according to claim 11, wherein
at least one of said side panels has a double wall; and
a rigid longitudinal member is lodged within said double wall.

20. The wearable garment according to claim 11, wherein
at least said front portion of said connecting means includes a pair of opposed eyelets; and
a tie closure for joining said eyelets so as to, in use, maintain said garment on said pet's back.

* * * * *